July 6, 1954　　　　J. K. McCUTCHEN　　　　2,682,841
APPARATUS FOR PRODUCING A TUFTED DESIGN
Filed Dec. 1, 1950　　　　　　　　　　15 Sheets-Sheet 1
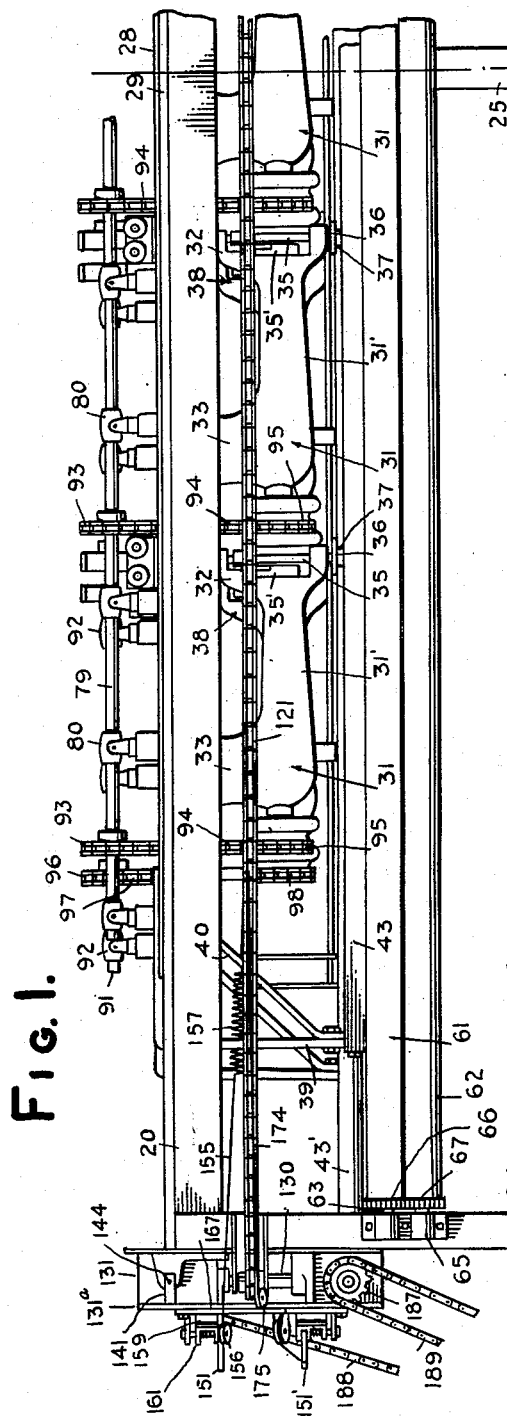
INVENTOR
J.K. McCutchen
BY
ATTORNEY July 6, 1954     J. K. McCUTCHEN     2,682,841
APPARATUS FOR PRODUCING A TUFTED DESIGN
Filed Dec. 1, 1950     15 Sheets-Sheet 2
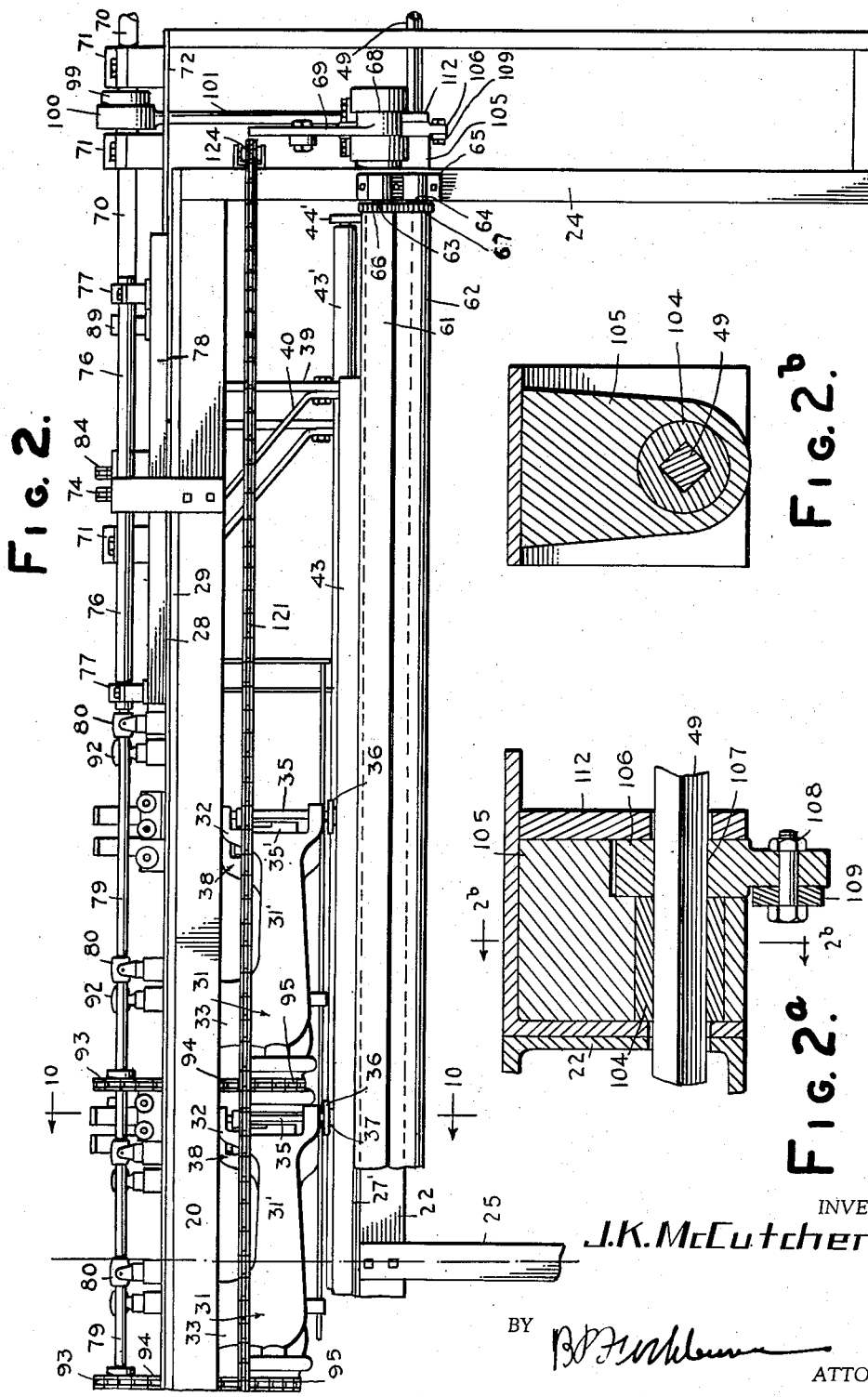
INVENTOR
J.K.McCutchen
BY
ATTORNEY

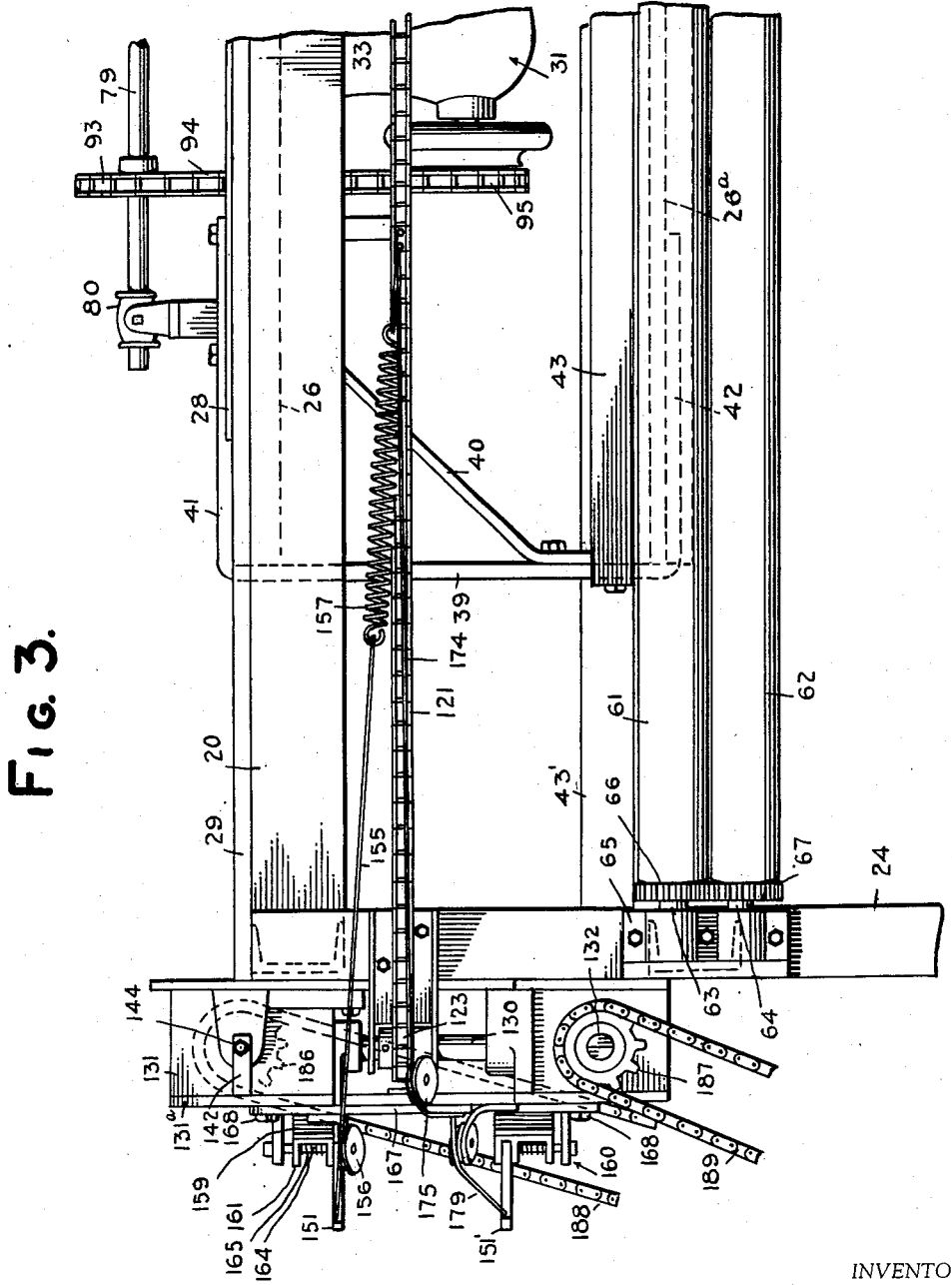

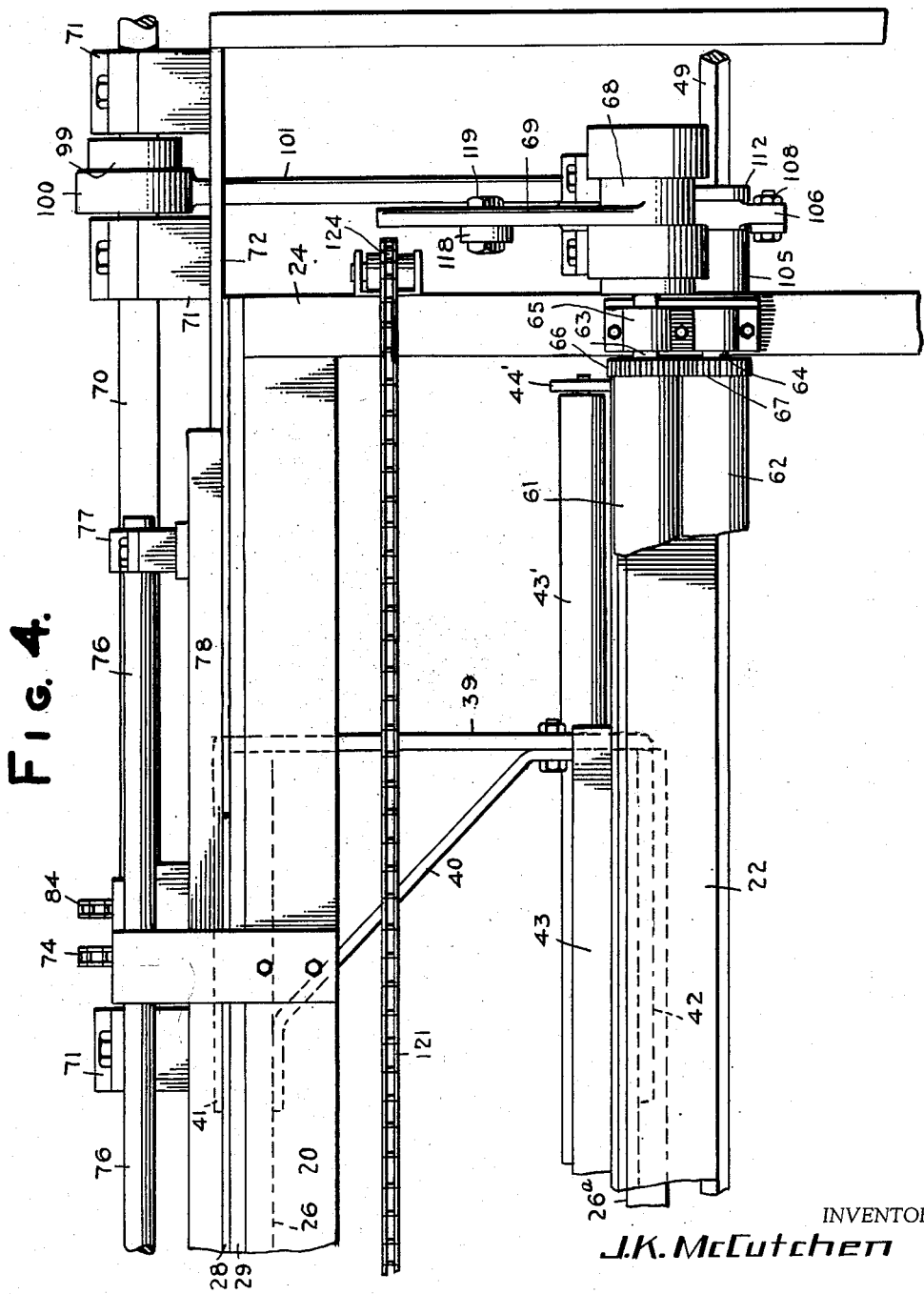

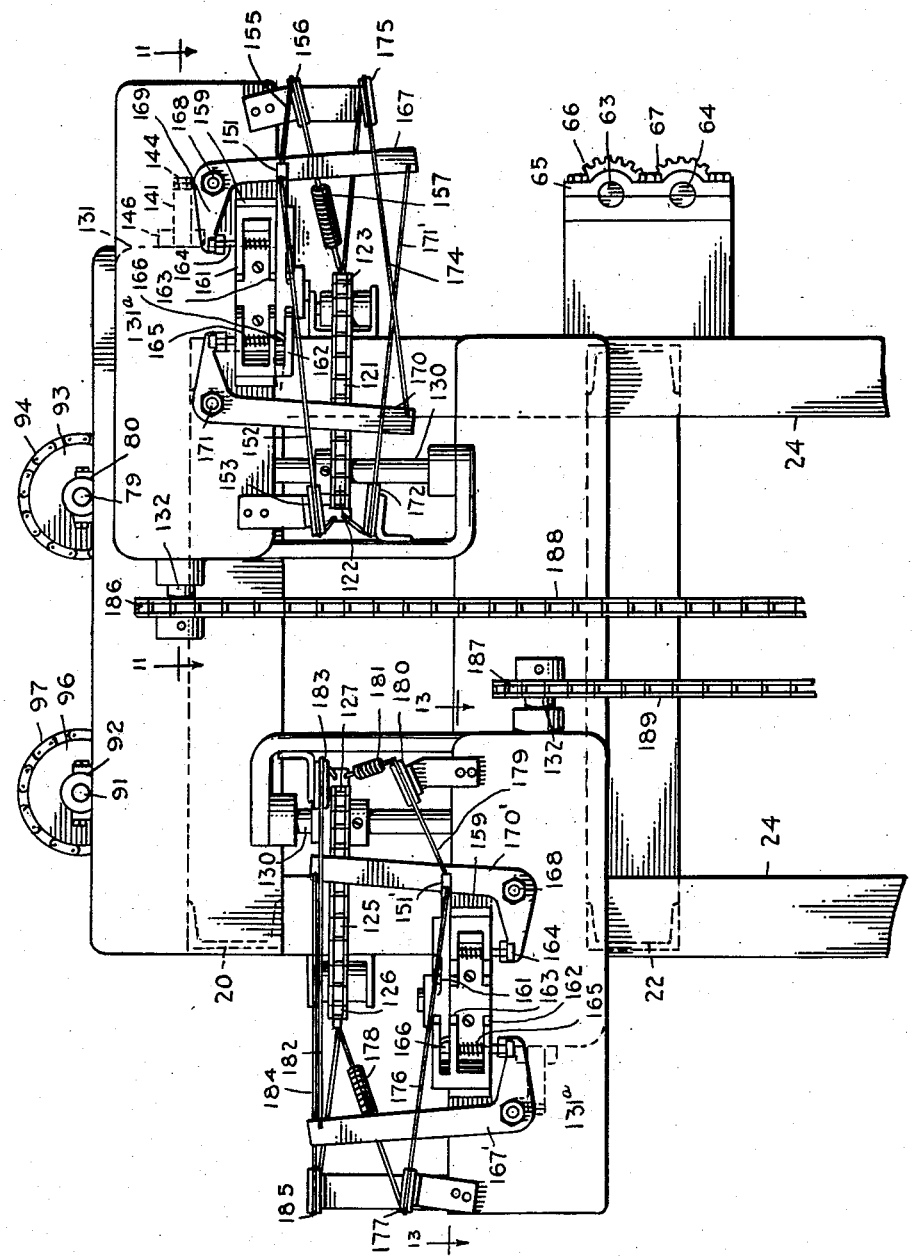

July 6, 1954  J. K. McCUTCHEN  2,682,841
APPARATUS FOR PRODUCING A TUFTED DESIGN
Filed Dec. 1, 1950  15 Sheets-Sheet 6
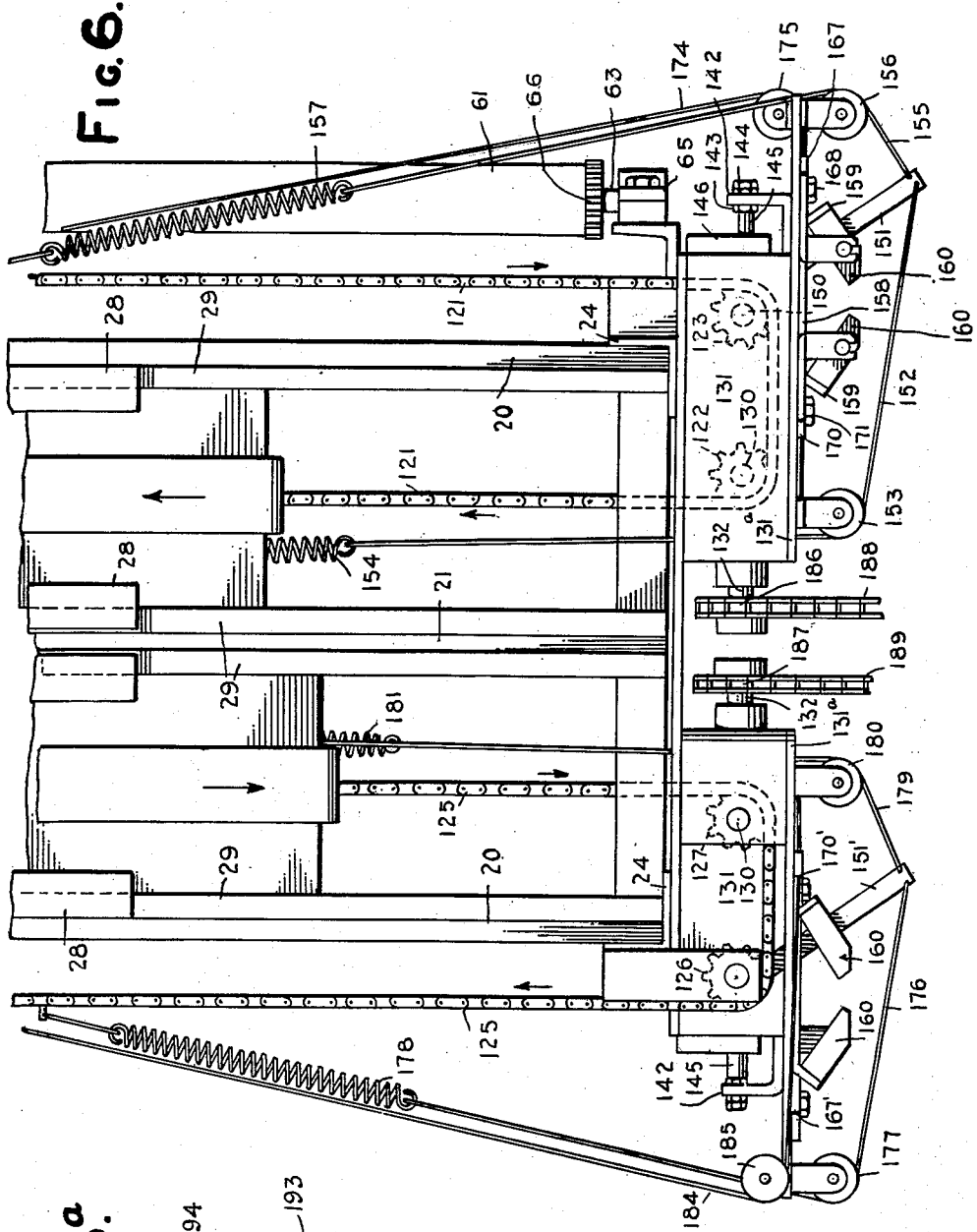
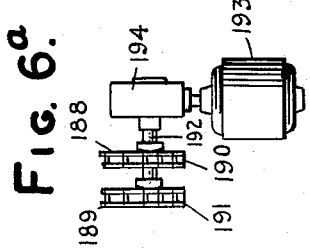
INVENTOR
J.K. McCutchen
BY
ATTORNEY July 6, 1954  J. K. McCUTCHEN  2,682,841
APPARATUS FOR PRODUCING A TUFTED DESIGN
Filed Dec. 1, 1950  15 Sheets-Sheet 7
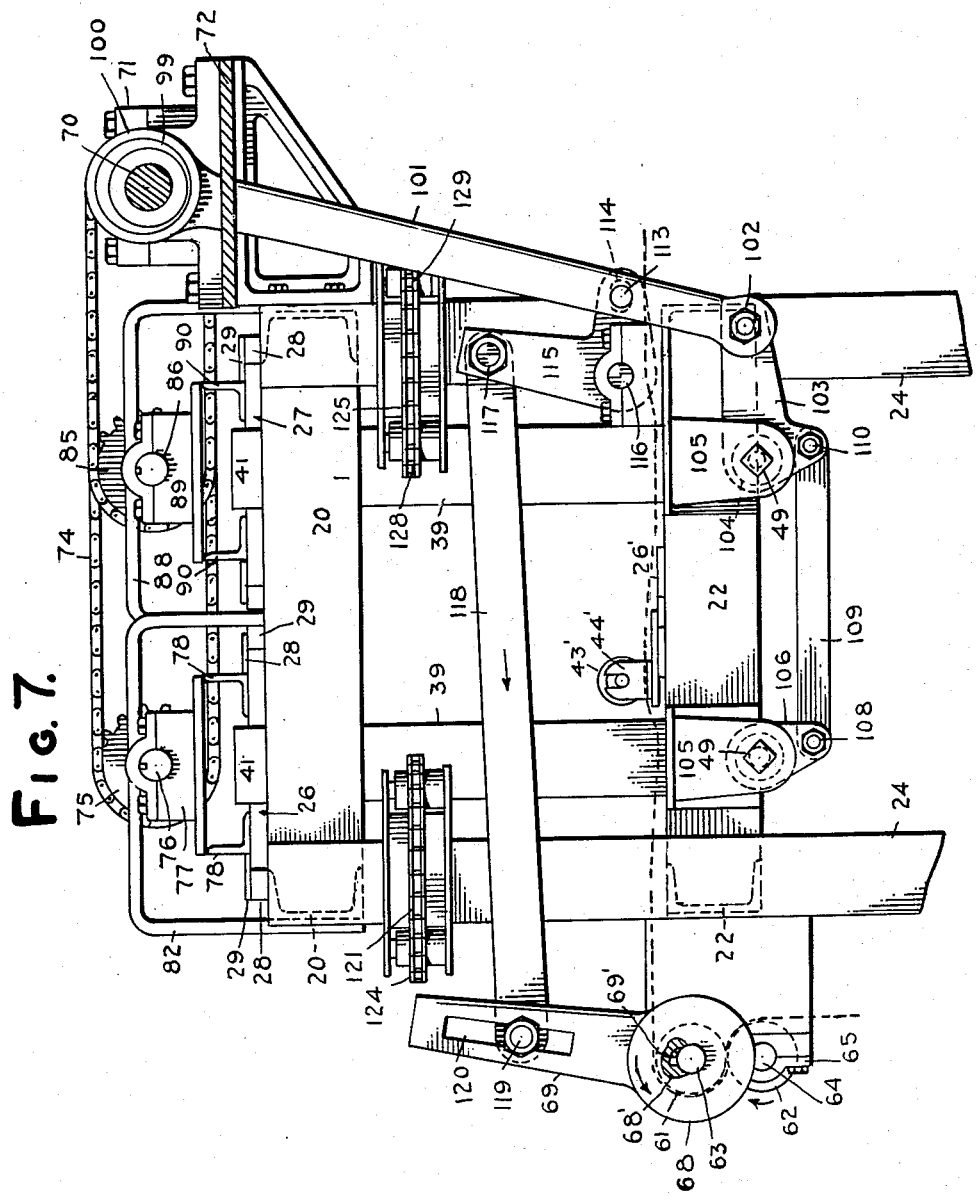
INVENTOR
J.K. McCutchen
BY
ATTORNEY

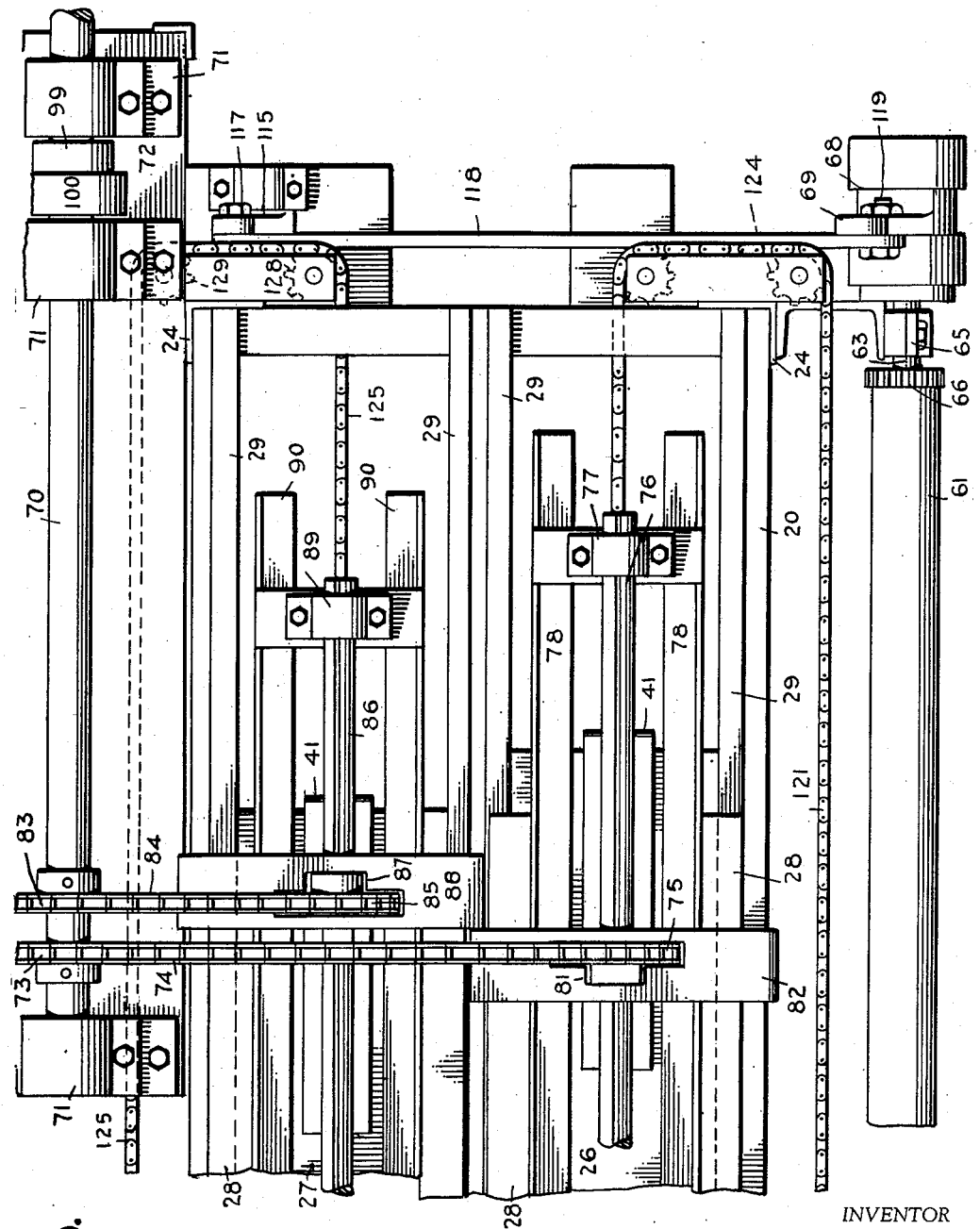

July 6, 1954  J. K. McCUTCHEN  2,682,841
APPARATUS FOR PRODUCING A TUFTED DESIGN
Filed Dec. 1, 1950  15 Sheets-Sheet 9
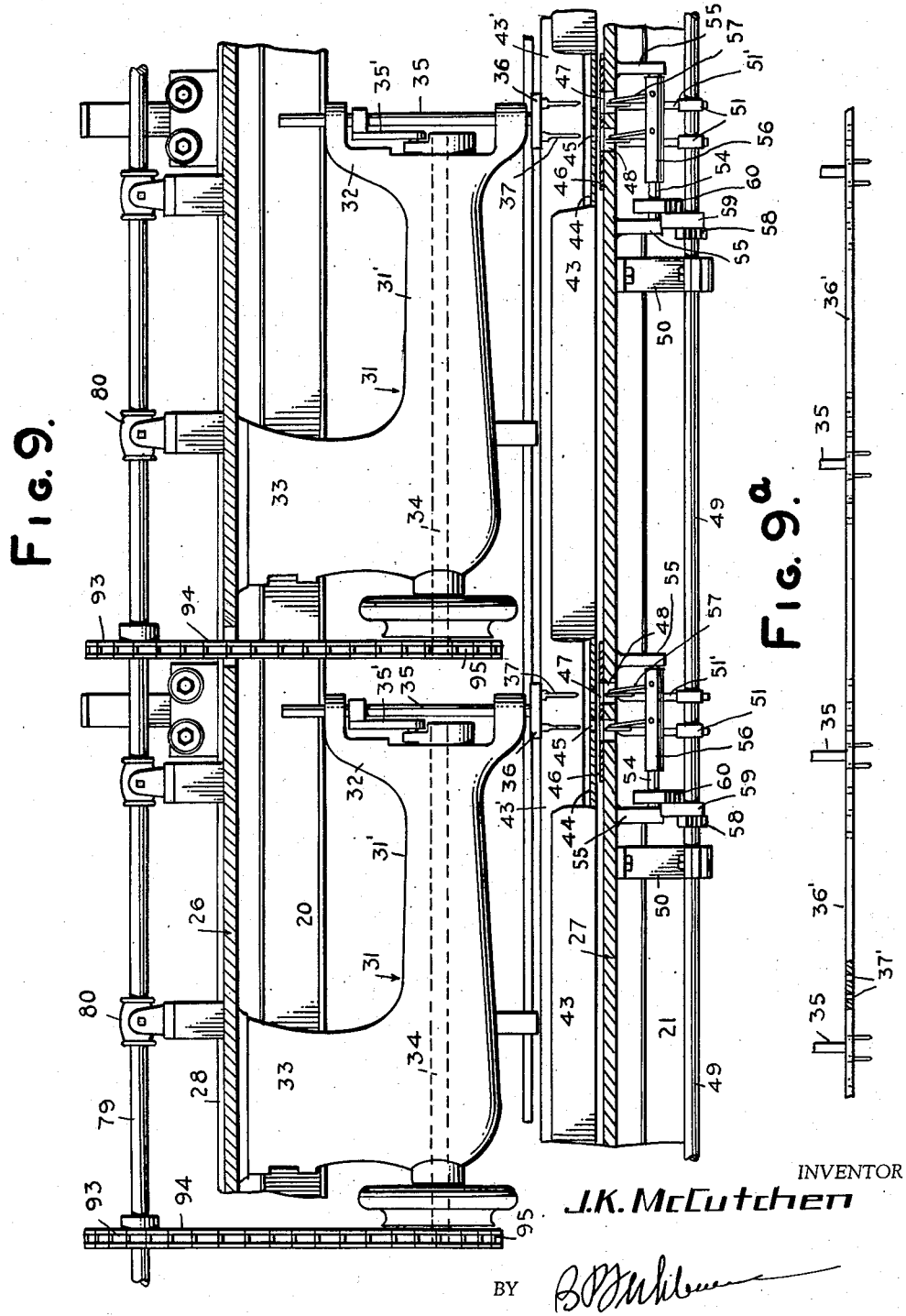
INVENTOR
J.K. McCutchen
BY
ATTORNEY July 6, 1954  J. K. McCUTCHEN  2,682,841
APPARATUS FOR PRODUCING A TUFTED DESIGN
Filed Dec. 1, 1950  15 Sheets-Sheet 10
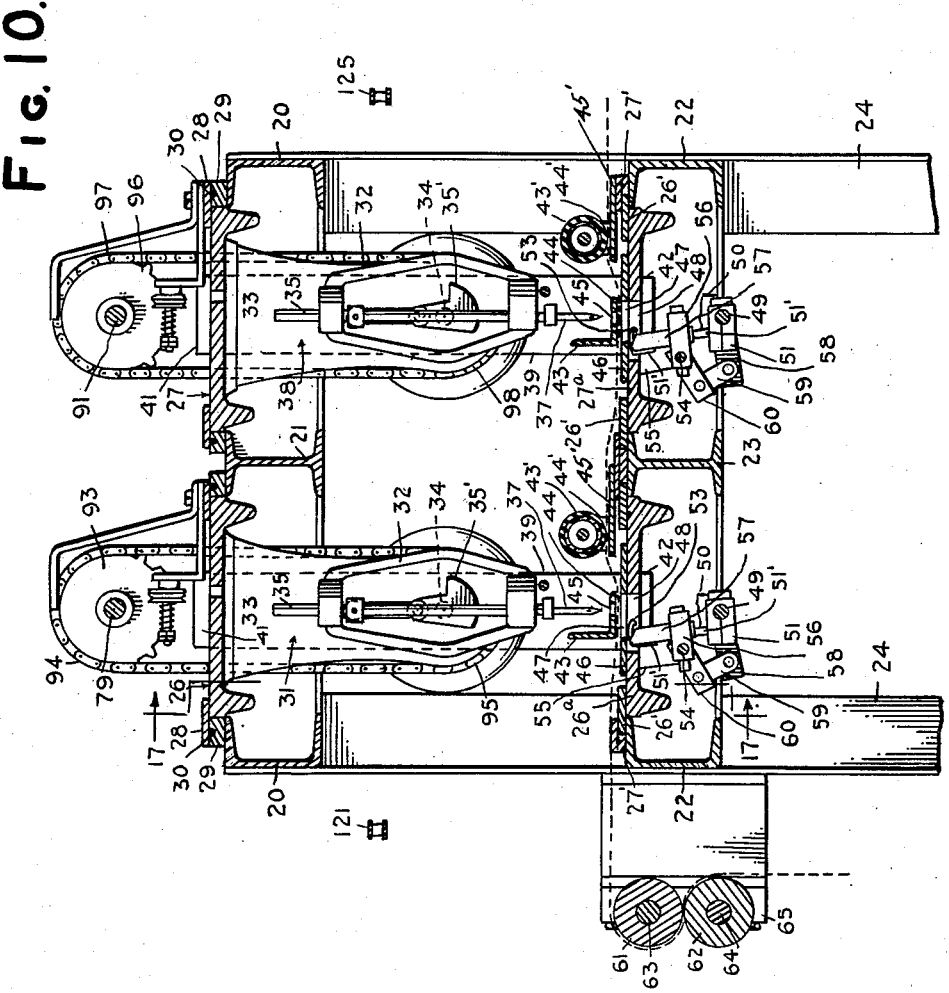
INVENTOR
J.K. McCutchen
BY 
ATTORNEY

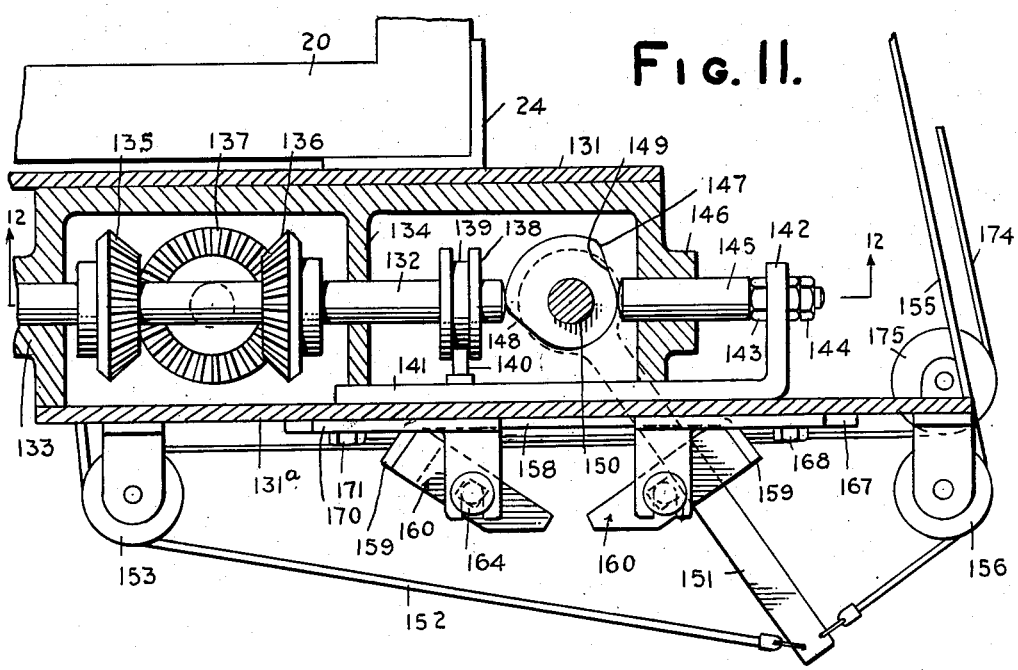
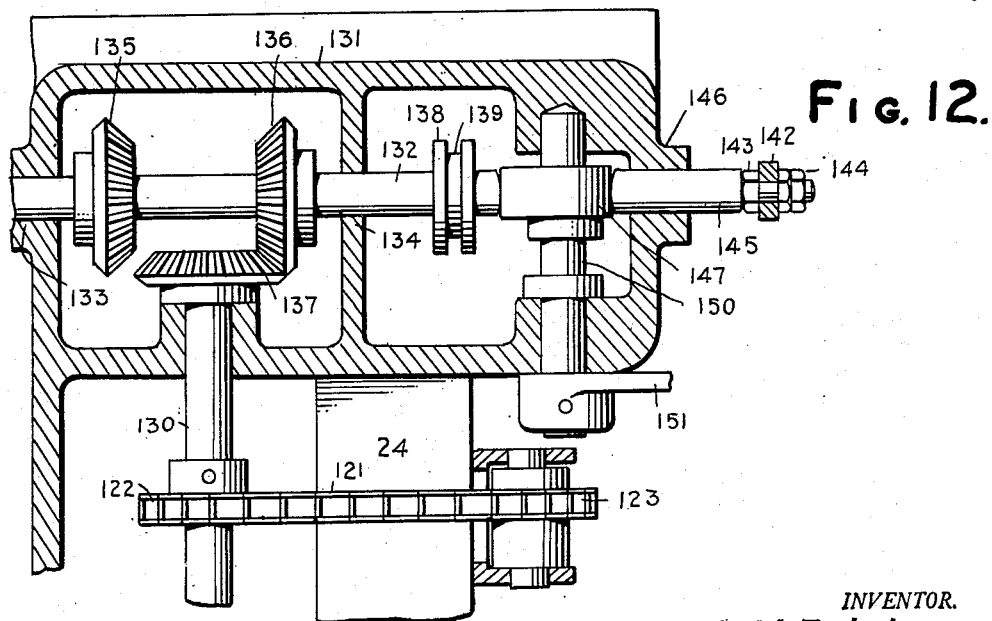

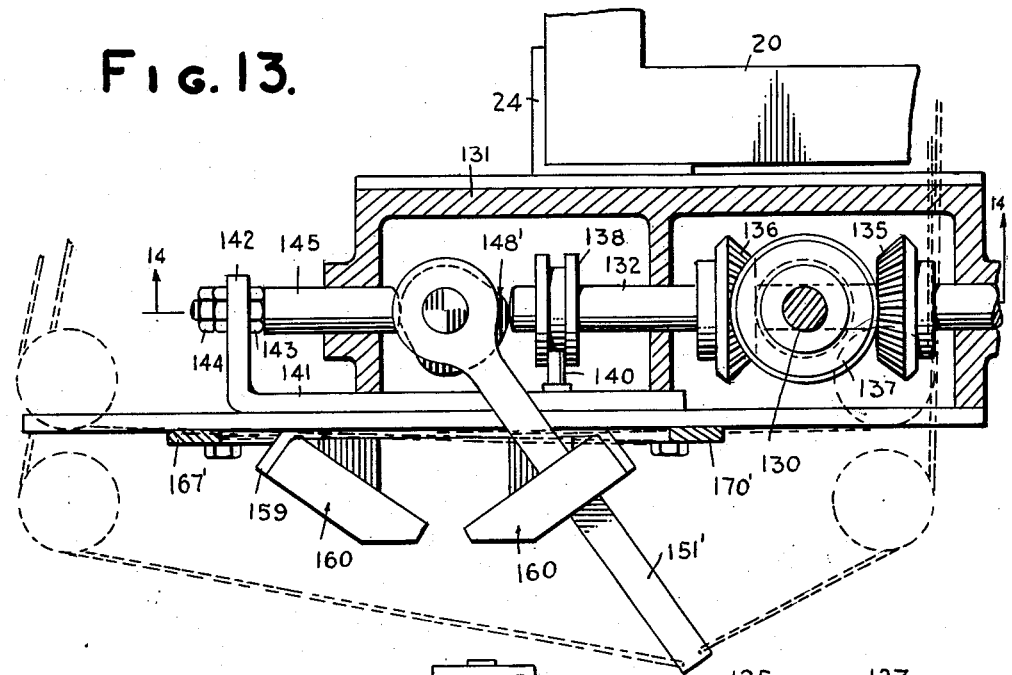
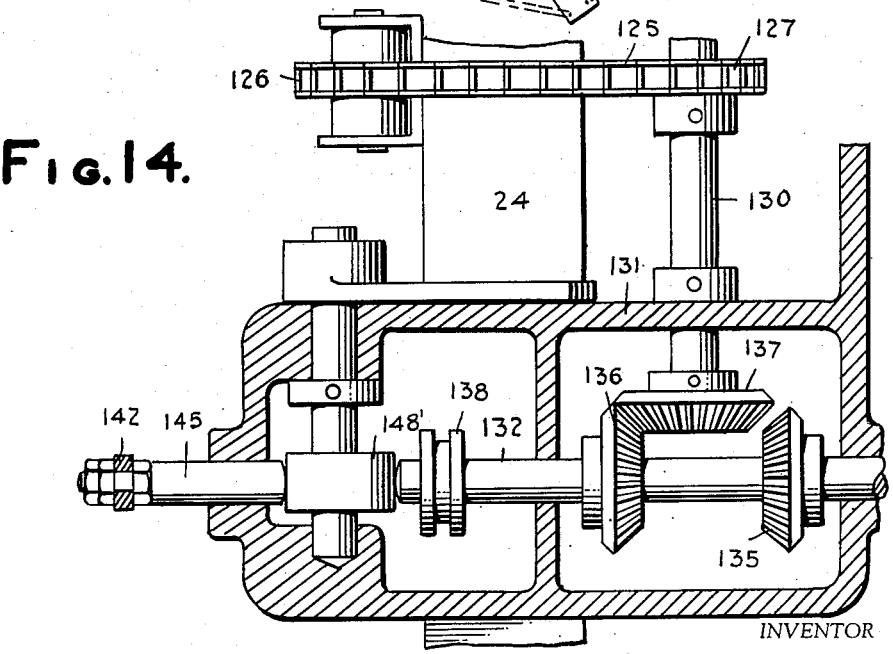

July 6, 1954  J. K. McCUTCHEN  2,682,841
APPARATUS FOR PRODUCING A TUFTED DESIGN
Filed Dec. 1, 1950  15 Sheets-Sheet 13
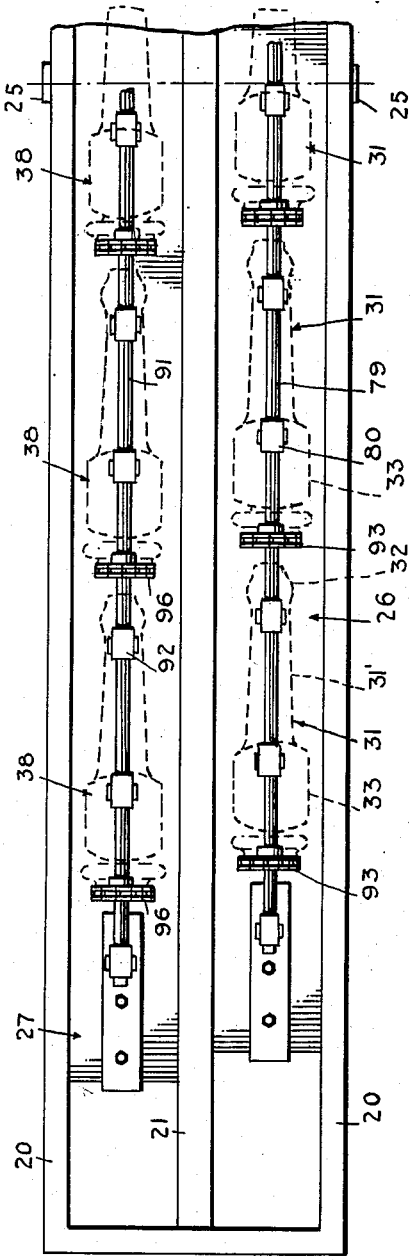
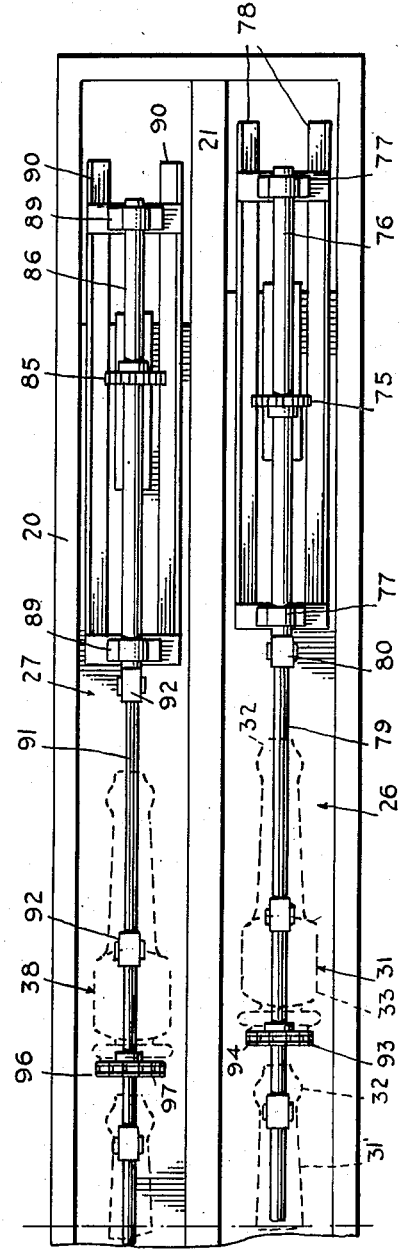
INVENTOR
J. K. McCutchen
BY *[signature]*
ATTORNEY July 6, 1954     J. K. McCUTCHEN     2,682,841
APPARATUS FOR PRODUCING A TUFTED DESIGN
Filed Dec. 1, 1950     15 Sheets-Sheet 14
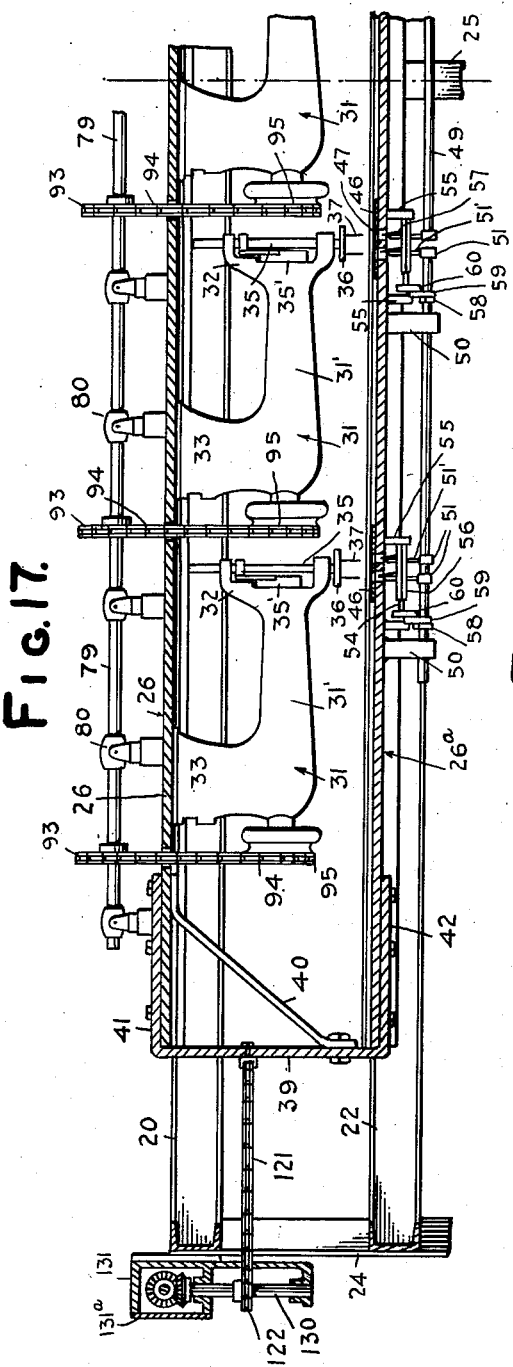
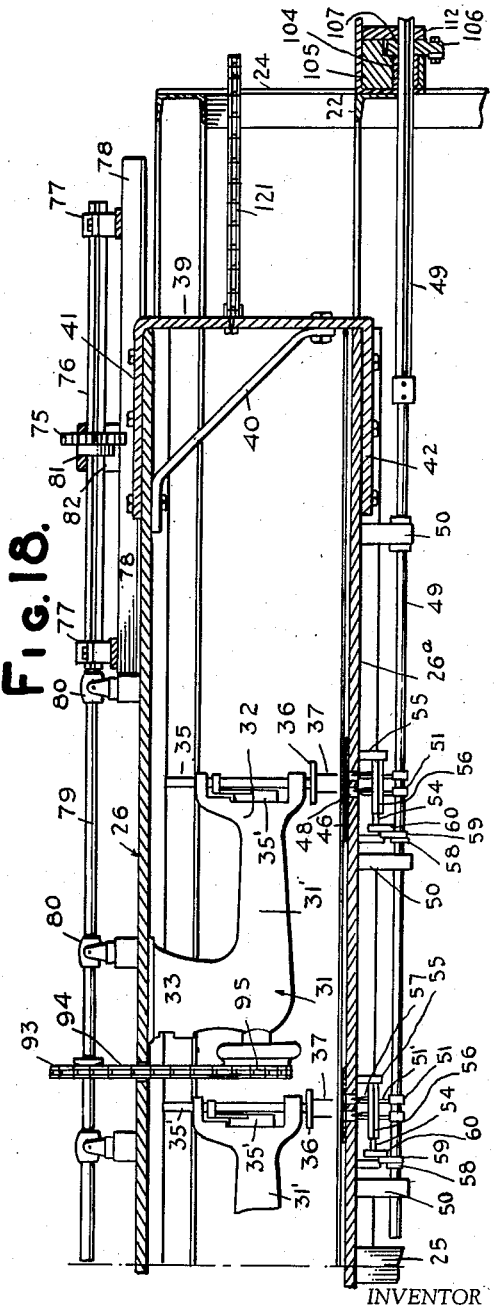
INVENTOR
J. K. McCutchen
BY
ATTORNEY July 6, 1954 — J. K. McCUTCHEN — 2,682,841
APPARATUS FOR PRODUCING A TUFTED DESIGN
Filed Dec. 1, 1950 — 15 Sheets-Sheet 15
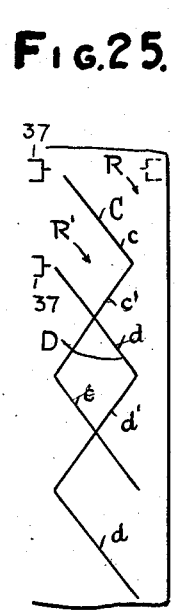
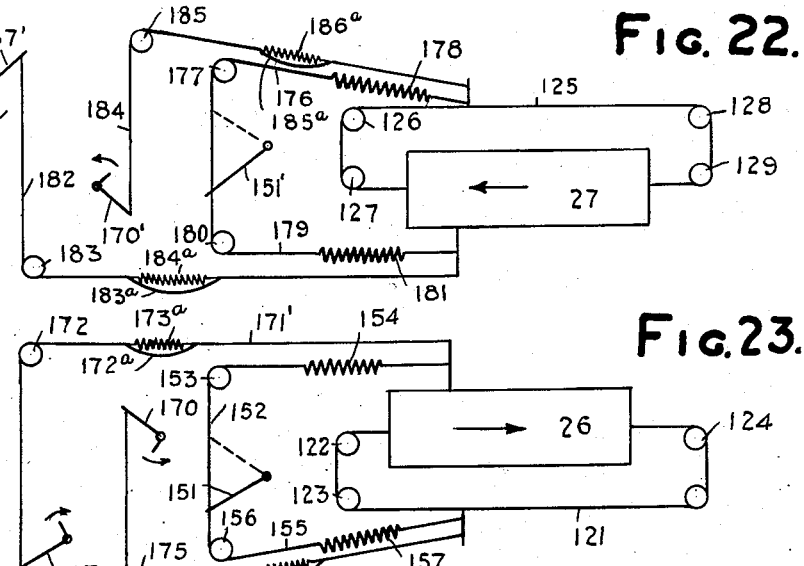
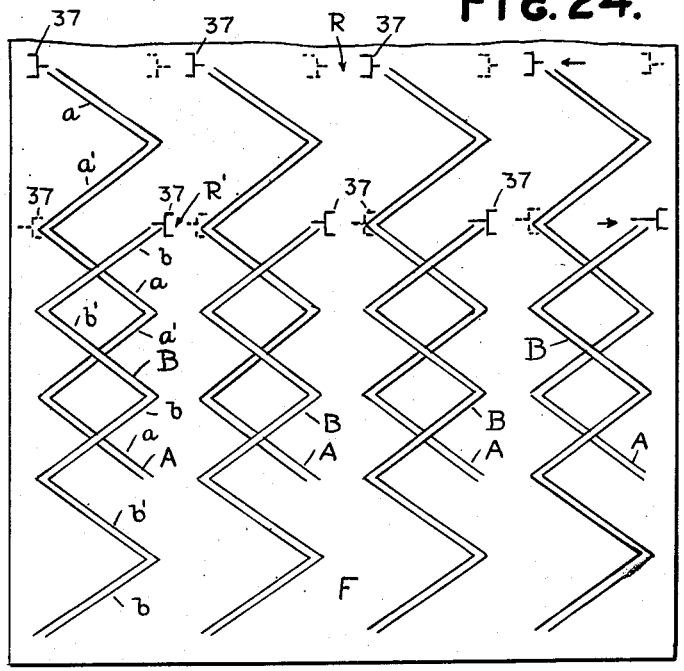
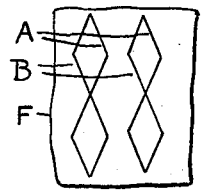
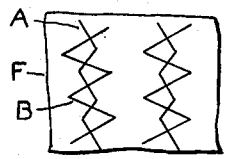
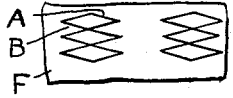
INVENTOR
J. K. McCutchen
BY
ATTORNEY Patented July 6, 1954

2,682,841

UNITED STATES PATENT OFFICE 2,682,841

APPARATUS FOR PRODUCING A TUFTED DESIGN

Joseph K. McCutchen, Ellijay, Ga.

Application December 1, 1950, Serial No. 198,563

9 Claims. (Cl. 112—79)

1

The present invention relates to an apparatus for sewing line or lines of severed or unsevered tufting into a fabric base for producing a design.

An important object of the invention is to provide apparatus of the above-mentioned character which will produce the severed or unsevered tufted design rapidly and cheaply.

A further object of the invention is to provide apparatus of the above-mentioned character which will accurately produce the designs of the desired shape and size.

A further object of the invention is to provide apparatus of the above-mentioned character, which is adjustable to vary the shape of the design.

Other objects and advantages of the invention will be apparent during the course of the following description.

In the accompanying drawings forming a part of this application and in which like numerals are employed to designate like parts throughout same, Figure 1 is a front side elevation of the machine embodying the invention, the right half of the machine being broken away, Figure 2 is a similar view of the right half of the machine, the left half being broken away, Figure 2a is an enlarged central longitudinal section through a bearing and associated elements, Figure 2b is a transverse section taken on line 2b—2b of Figure 2a, Figure 3 is an enlarged front elevation of the left end portion of the machine, the remainder of the machine being broken away, Figure 4 is a similar view of the right end portion, Figure 5 is a left end elevation of the machine, as viewed from Figure 1, Figure 6 is a plan view of the left end of the machine, shown in Figure 5, Figure 6a is a side elevation of driving means, Figure 7 is a right end elevation of the machine as shown in Figure 2, Figure 8 is a plan view of the right end of the machine as shown in Figure 7, Figure 9 is an enlarged side elevation of the two center tufting machines shown in Figures 1 and 2, parts of the apparatus being shown in section, parts broken away and parts omitted, Figure 9a is a side elevation of a horizontal needle carrying bar, Figure 10 is a transverse vertical section taken on line 10—10 of Figure 2, Figure 11 is a horizontal section taken on line 11—11 of Figure 5, Figure 12 is a vertical section taken on line 12—12 of Figure 11, parts in elevation, Figure 13 is a horizontal section taken on line 13—13 of Figure 5,

2

Figure 14 is a vertical section taken on line 14—14 of Figure 13, parts in elevation, Figure 15 is a plan view of the left half of the machine, the right half being broken away, and parts omitted, Figure 16 is a plan view of the right half of the machine, the left half being broken away and parts omitted, Figure 17 is a longitudinal vertical section through the left half of the machine and through the forward supporting unit, taken on line 17—17 of Figure 10, parts omitted, Figure 18 is a similar view through the right half of the machine taken on the same section line, Figure 19 is a plan view of a latch device for holding the shifting lever in place, Figure 20 is a side elevation of the same, Figure 21 is a vertical section taken on line 21—21 of Figure 19, Figure 22 is a diagrammatic view of the rear bed and associated elements, showing the same in the starting position, Figure 23 is a similar view of the front bed and associated elements, Figure 24 is a plan view of the fabric base and the lines of tufting sewed therein to produce the design, Figure 25 is a fragmentary plan view of the fabric base showing a modified form of lines of tufting sewed therein for producing the design, Figure 26 is a fragmentary plan view of the fabric base showing a modified design, Figure 27 is a similar view showing a modified design, Figure 28 is a similar view showing a modified design.

In the drawings, a supporting structure is shown including an upper horizontal frame 20, Figures 1, 2, 3, 4, 5, 6, and 7, which may be formed of channel irons having an I-beam 21 extending longitudinally thereof at the transverse center of the frame, Figures 6, 10 and 15. The numeral 22 designates a lower horizontal frame, Figures 5 and 10, which may be formed of channel irons having an I-beam 23 rigidly secured thereto at the transverse center of the lower frame. These upper and lower horizontal frames are similar. The frames 20 and 22 are rigidly secured to end legs 24. The numeral 25 designates center legs, Figures 1 and 2, which are secured to the lower frame 22 and terminate at the elevation of the lower frame.

Mounted upon the upper horizontal frame 20 of the supporting structure, are two reciprocatory supporting units which are substantially identical. These supporting units include a forward bed 26 and a rear bed 27, Figures 1, 2, 6, 9, 10, 15, 16, 17 and 18, 22 and 23. These beds extend throughout the major portion of the length of the frame 20 and have their ends suitably spaced from the ends of the frame 20 to permit of the reciprocation of the beds, Figures 15 and 16. Rigidly secured to the tops of the beds 26 and 27 are plates 28, Figure 10, which travel over longitudinal guides 29, rigidly secured to the top of the frame 20 and the I-beam 21. Ball bearings 30 may be arranged between the plates 28 and guides 29. Arranged beneath the bed 26 are tufting units 31, which are identical. Each unit 31 includes an arm 31', Figure 9, having a head 32 and a stock 33, which is rigidly secured to the bed 26. These parts are conventional except that they are inverted. The arm 31' carries the usual drive shaft 34, which reciprocates the needle bar 35, through the driving connection 35'. Each needle bar extends below the head 32 and carries a plate 36, having a pair of needles secured thereto and depending therefrom. The tufting or sewing machine units thus described are arranged in a group extending longitudinally of the bed 26 and the tufting units in each group are spaced longitudinally of the bed and the unit shifts bodily with the bed. Tufting units 38 are mounted upon the bed 27 and depend therefrom and these tufting units 38 are identical with the tufting units 31 and their group arrangement is identical. Four tufting units 31 are shown in the front group and four tufting units 38 in the rear group.

The numerals 26ª and 27ª designate lower beds, Figures 10, 17 and 18. The lower bed 26ª is arranged beneath and in alignment with the upper bed 26 and is secured thereto by vertical arms 39 and diagonal braces 40. Vertical arms 39 have upper and lower horizontal extensions 41 which are rigidly secured to the beds 26 and 26ª by bolts or the like. It is thus seen that the upper and lower beds 26 and 26ª and their connections constitute a reciprocatory supporting unit. The bed 26ª has strips 26' rigidly secured thereto, operating in guides 27', secured to the channel iron 22 and I-beam 23. The lower bed is therefore guided in its movement and the weight of the lower bed may be carried by the upper bed 26. The lower bed 27ª is arranged beneath and in alignment with the upper bed 27 and is rigidly secured thereto by the same vertical arms 39 and diagonal braces 40, having the horizontal extensions 41 and 42. The beds 27 and 27ª constitute a reciprocatory supporting unit. The bed 27ª is equipped with the same plates 26' operating within the guide means 27', rigidly secured to the angle iron 22 and I-beam 23. The lower bed 27ª may have its weight supported by the upper bed 27.

Extending between the pair of vertical arms 39 in each supporting unit is a horizontal presser foot 43, Figures 1, 2, 3, 4 and 10, which are rigidly attached to each pair of arms to move therewith. This presser foot may be in the form of an angle iron having a horizontal web 44 provided with suitable apertures 45 for the passage of the needles. The presser foot is arranged near and spaced above the base plate 46, for the passage beneath the same of the fabric base. This base plate is used with the ordinary feed dogs which have been removed. These base plates have openings 47 leading into openings 48 formed in the beds 26ª and 27ª, Figure 10.

Disposed rearwardly of each presser foot 43 is a horizontal guide roller 43', rotatably mounted upon brackets or arms 44', in turn mounted upon stationary plates 45', Figure 10. Each roller 43' is mounted upon the stationary lower frame 22 and does not reciprocate with the presser foot 43, and the roller 43' is longer than the presser foot 43, Figures 1, 2, 3, 4 and 10.

Arranged beneath the beds 26ª and 27ª are horizontal rock shafts 49, Figures 9 and 10, journaled in bearings 50, rigidly secured to the beds 26ª and 27ª and depending therefrom. Each rock shaft 49 carries pairs of loopers 51' for coaction with the pairs of needles 37. Each rock shaft 49 has pairs of blocks 51 clamped thereon and the loopers 51' are secured to these blocks. These loopers have bills or hooks 53 which face in an opposite direction to the travel of the work, as is customary in tufting machines. Arranged near each pair of loopers 51' is a rock shaft 54, journaled in stationary bearings 55, carried by the beds 26ª and 27ª. Each rock shaft 54 has a block 56 rigidly secured thereto, and this block has a pair of blades 57 mounted thereon. These blades are arranged to sever the loops formed upon the loopers 51' and leave at least one loop unsevered upon each looper, as is customary in the operation of tufting machines. Each rock shaft 49 has a crank 58 rigidly secured thereto, pivotally connected with a link 59, in turn pivotally connected with a crank 60, which is rigidly secured to the rock shaft 54 to turn it. This is the conventional looper and cutter mechanism present in the conventional sewing machine. When the needles descend, the bills of the loopers enter the loops produced by the needles beneath the fabric, and when the needles rise, the loopers with the loops thereon move forwardly from the path of travel of the needles and the loops upon the loopers are severed, leaving at least one unsevered loop upon the looper.

Disposed upon the front side of the machine, Figures 1, 2, 3, 4, 9 and 10, are fabric feed rollers 61 and 62, arranged in superposed relation. The fabric base, Figures 7 and 10, passes forwardly over the upper feed roller 61 and between the upper and lower feed rollers and then rearwardly of the lower feed roller. These feed rollers are mounted upon shafts 63 and 64, to rotate therewith, and these shafts are journaled in fixed bearings 65. At the ends of the shafts 63 and 64, are gears 66 and 67, rigidly mounted thereon, and these gears are in permanent mesh so that the rollers 61 and 62 turn in opposite directions to feed the fabric forwardly. The upper shaft 63 has an intermittently operated device to turn it, Figure 7, including a head 68 pivoted upon the shaft 63, and connected or locked with the shaft by a roller 68' operating in a curved tapered slot 69', decreasing in size rearwardly. The head 68 is turned by a lever or crank 69. When the lever 69 is swung forwardly, the roller 68' moves into the contracted end of the slot 69 and the head is locked to the shaft 63, so that the head 68 may turn the shaft 63, but when the head 68 moves rearwardly or clockwise, Figure 7, the head will turn with respect to the shaft 63.

Arranged near the right end of the machine, at the rear of the same, Figures 7 and 8, is a horizontal drive shaft 70, journaled in stationary bearings 71, bolted to a fixed top 72, secured to the upper frame 20. The shaft 70 extends outwardly beyond the bearing 71 and is power-driven by a motor or the like. The shaft 70 has a sprocket wheel 73, Figure 8, rigidly secured thereto, driving a sprocket chain 74, extending forwardly of the machine and engaging a sprocket wheel 75, which is splined upon a horizontal shaft 76. This shaft has a portion journaled in upstanding bearings 77 which are rigidly mounted upon the base 26 through the medium of angle irons 78 or the like rigidly attached to the base. This shaft, Figures 1 and 2, has a reduced portion 79, journaled in bearings 80, suitably mounted upon the bed 26. The shaft 76 rotates and moves longitudinally with the bed 26. The sprocket wheel 75 which is splined upon the shaft 76 is held against longitudinal movement by operating within an opening 81 formed in a stationary inverted U-shaped bracket 82 which is mounted upon the stationary frame 20, Figure 8. It is thus seen that the sprocket wheel 75 drives the shaft 76 and permits of the longitudinal movement of the shaft 76. A second sprocket wheel 83, Figure 8, corresponding to the sprocket wheel 73, is rigidly mounted upon the shaft 70 and drives a sprocket chain 84, extending forwardly to engage a sprocket wheel 85, Figures 7 and 8, splined upon a rear longitudinal shaft 86, corresponding to the shaft 76. The sprocket wheel 85 is held against longitudinal movement by operating within an opening 87 formed in a stationary inverted U-shaped bracket 88, rigidly mounted upon the frame 20. The sprocket wheel 85 therefore rotates the shaft 86 and permits the same to move longitudinally. The shaft 86 is identical with the shaft 76 and is mounted in bearings 89, mounted upon angle irons 90, rigidly secured to the bed 27. This construction is identical with the construction embodying the angle irons 78. The shaft 86 has a reduced portion 91, Figures 15 and 16, mounted in bearings 92, rigidly secured to the bed 27 and corresponding to the bearings 80. The reduced portion 79 of the shaft 76 has sprocket wheels 93 rigidly mounted thereon, Figure 10, driving depending sprocket chains 94, engaging sprocket wheels 95, Figure 9, which drive the shafts 34 of the front set of tufting machine units 31. The reduced portion 91 of the shaft 86, Figures 10, 15 and 16, have sprocket wheels 96 rigidly mounted thereon, driving depending sprocket chains 97, driving sprocket wheels 98 secured to the shafts 34 of the rear set of tufting machine units 31'. It is thus seen that the shafts 34 of all tufting machine units are driven in the same direction and at the same speed.

In view of the description heretofore given, it is seen that the machine embodies front and rear supporting units, which are reciprocated in a direction transversely of and at right angles to the line of feed of the base fabric, by means to be described. The fabric is fed longitudinally in a forward direction by means of the feed rollers 61 and 62. In the present embodiment of the invention as shown, there is a tufting mechanism mounted upon each supporting unit. This tufting mechanism may embody separate tufting machines, four being shown for the purpose of illustration. Each tufting machine includes the upper tufting unit including the needle operating means mounted upon the upper bed and the looper mechanism arranged beneath and mounted upon the lower bed. The tufting mechanisms are spaced longitudinally of the direction of feed of the fabric base, and this spacing may determine the size and shape of the design to be produced. It is contemplated to vary the spacing of the tufting mechanisms longitudinally of the line of feed of the fabric base. As more clearly shown in Figure 9, each needle bar 35 is equipped with a short horizontal needle carrying bar 36. The tufting machines in each group are driven at the same speed, and by having the separate horizontal needle carrying bars 36, it has been found that the tufting machines can be driven at a higher speed. However, it is contemplated to substitute a single horizontal bar 36', for the separate bars 36, and rigidly mount the bar 36 upon the vertical reciprocatory needle bars 35. The common bar 36' will have vertical openings 37' formed therein throughout its entire length and these openings will be spaced and will permit of a large range of adjustment of the needles to vary the design. The single horizontal needle carrying bar will also insure that the vertical reciprocatory bars 35 will be synchronized in operation.

As more clearly shown in Figures 2, 4, 7 and 8, the numeral 99 designates an eccentric which is rigidly mounted upon the shaft 70 and this eccentric is engaged by an eccentric strap 100 carried by a connecting rod 101, extending downwardly for pivotal connection at 102 with a bell crank lever 103. The shafts 49 are journaled in the bearings 50, Figures 9 and 10, 17 and 18, and the right ends of the shafts 49 are formed square in cross-section, Figure 18, and these square ends are slidably mounted within bearing sleeves 104, rotatable within bearing blocks 105, rigidly secured to the right end of the lower frame 22. Mounted upon the forward shaft 49, Figures 7, 10 and 18, is a crank 106 having an opening 107 formed square in cross-section to slidably receive the square end portion of the shaft 49. It is thus seen that the shaft 49 may be shifted longitudinally and turned by the swinging movement of the crank 106. The lower end of the crank 106 is pivotally connected at 108 with the horizontal link 109, pivotally connected at 110 with the bell crank lever 103. This bell crank lever has a square opening formed therein to receive the square end portion of the rear shaft 49, which slides therein. The same bearing sleeve 104 and bearing block 105 are employed for the rear shaft 49 and fixed plates 112 are employed to prevent the longitudinal movement of the crank 106 and the bell crank lever 103 in one direction. From the foregoing description, it is thus seen that the rotation of the shaft 70, Figure 7, reciprocates the connecting rod 101 which in turn rocks the two shafts 49, having slidable engagement with the cranks which turn them.

The connecting rod 101 has a pin 113 which is rigidly secured thereto and this pin operates within an elongated slot 114 formed in a horizontal arm of a vertically swinging bell crank lever 115, mounted upon a fixed pivot 116. This bell crank lever is pivotally connected at 117, with a link 118, extending forwardly for connection with the lever 69. To effect this connection, the link 118 carries a bolt 119, pivotally connected with such link, and this bolt is adjustable longitudinally within an elongated slot 120 formed in the lever 69, and may be locked in this slot at the selected adjusted position. By vertically adjusting the bolt 119, the throw of the lever 69 by the action of the link 118 may be regulated. The reciprocation of the connecting rod 101 is transmitted to the lever 69, which in turn effects an intermittent turning movement of the feed rollers 61 and 62, to advance the fabric forwardly.

The loopers 51', blades 57, needle bars 35 and feed rollers 61 and 62 are timed in operation. When the needle bars descend and the needles 37 pass through the fabric, the loopers move toward the needles and enter the loops. The lever 69 is now swinging rearwardly, Figure 7, and the feed rollers 61 are stationary. While the needles are penetrating the fabric, the feed rollers 61 and 62 are stationary, as stated, and when the needle bars 35 move upwardly, the loopers 51' move from the needles and the blades 57 travel with the loopers and upwardly with relation thereto and sever the loops upon the loopers, leaving at least one unsevered loop upon each looper. When the needle bars move upwardly, the link 118 is moving forwardly and the lever 69 is swung forwardly. There is sufficient lost motion between the intermittent clutch device operated by the lever 69 and the shaft 63, so that the lever 69 in its forward movement will not turn the shaft 63 until the needles 37 move upwardly sufficiently to clear the fabric, and when the needles pass above the fabric, the continued forward movement of lever 69 advances the feed rollers 61 and 62 a step, to feed the fabric a step, which determines the distance between the sides of the loops being sewed into the fabric. When the needles are moving downwardly, the rollers 61 and 62 remain stationary.

It is thus seen that tufting machines or tufting mechanisms are provided, and arranged in forward and rear groups, and shiftable transversely of the direction of feed of the fabric effected by the rollers 61 and 62. These feed rollers are common to all tufting machines or tufting mechanisms and the usual feed dogs are dispensed with. While the tufting machines or tufting mechanisms are shown equipped with blades to sever the loops, it is to be understood that the blades may be omitted, and the tufting machines or tufting mechanisms employed to sew lines of unsevered tufting. When this is desired, the loopers are adjusted to face in the direction of travel of the work, as is well known in the tufting art. The terms of "tufting machine" or "tufting mechanism" are used in the description and claims to cover machines and mechanisms which will sew lines of severed or unsevered tufting into the fabric.

Means are provided to reciprocate the beds 26 and 27. A horizontal chain 121, Figures 1, 3, 6, 17 and 23, is attached to the vertical arm 39 at the left end of the machine, Figure 17, and to the vertical arm 39 at the right end of the machine, and this chain is passed about horizontal sprocket wheels 122 and 123, Figures 5, 6, 12 and 23. The sprocket chain 121 extends to the right of the machine, Figures 2, 7, 8 and 18, and is passed about guide or idler sprocket wheel 124. This sprocket chain has its horizontal run arranged at the front of the machine near the work feed rollers 61 and 62. A rear chain 125, Figures 5, 6, 7, 8, 14 and 22, is attached to the opposite ends of the bed 27 in a similar manner described in connection with the chain 121. At the left end of the machine, the chain 125 passes over horizontal sprocket wheels 126 and 127, Figures 6 and 22, and at the right end of the machine, this chain 125 passes over idler sprocket wheels 128 and 129, Figures 8 and 22, suitably mounted upon the frame of the machine.

As more clearly shown in Figures 5, 6, 11 and 12, the sprocket wheel 123 is an idler sprocket wheel while the sprocket wheel 122 is a drive sprocket wheel and is rigidly mounted upon a vertical shaft 130, extending into a gear box 131, rigidly mounted upon the frame of the machine. A plate 131ª is rigidly secured to the gear box 131. Arranged within the gear box 131 is a horizontal shaft 132, journaled in bearings 133 and 134. This shaft carries spaced beveled gears 135 and 136, disposed upon opposite sides of a beveled gear 137 and arranged to alternately engage and disengage the beveled gear 137, but not to engage the beveled gear 137 at the same time. The beveled gear 137 is rigidly mounted upon the upper end of the vertical shaft 130. The shaft 132 carries a grooved disc 138, rigidly secured thereto, and this disc receives in its groove 139 a pin or finger 140, rigidly mounted upon a slide 141. This slide extends to the exterior of the gear box 131 and is provided with a horizontal lateral extension or arm 142, carrying a bolt 143, which is tapped into the arm and is adjustable thereon and may be locked in the selected adjusted position by nuts 144. The bolt 143 contacts with a plunger 145, which is separate from the bolt and is slidable in a guide or bearing 146. Arranged between the adjacent ends of the shaft 132 and the plunger 145 is a horizontaly swinging cam 147, having inclined faces 148 and 149, to contact with the shaft 132 and plunger 145 respectively, Figure 11. It is thus apparent that the arrangement is such that when the cam 147 is turned in opposite directions, the shaft 132 will be shifted longitudinally in opposite directions. The cam 147 is rigidly mounted upon a vertical shaft 150, Figure 12, and a horizontally swinging lever 151 is rigidly secured to the lower end of the shaft 150. A cable 152 is attached to the lever 151 and extends about a guide pulley 153 and has a retractile coil spring 154 connected therein, Figures 5, 6, 11 and 23. The spring 154 is suitably attached to the left end of the bed 26, Figure 23. The lever 151 has a cable 155 attached thereto and this cable is passed about the guide pulley 156. The cable 155 has a retractile coil spring 157 connected therein and this spring is attached to the run of the endless sprocket chain 121, disposed upon the forward side of the bed plate 26. It is thus seen that when the bed plate 26 moves to the right, Figure 23, the spring 154 is placed under tension while the spring 157 has its tension released or removed. When the bed 26 moves to the left, the spring 157 is placed under tension while the spring 154 is relieved of tension. These springs will ordinarily take up the slack in the cables. When the spring 154 is placed under tension, it tends to swing the lever 151 clockwise, Figures 6, 11 and 23, and when the spring 157 is placed under tension, it tends to swing the lever 151 counterclockwise, Figures 6, 11 and 23. Latch means, Figures 5, 6, 11 and 23, are provided to hold the lever 151 against swinging movement in either direction until the desired tension on the springs 154 and 157 is built up, which is determined by the movement of bed 26, after which the lever 151 is released and the spring under tension quickly throws the lever to the opposite direction. A horizontal plate 158, Figures 19 to 21 inclusive, is rigidly secured to the plate 131ª, and has angularly disposed ends 159, having keepers 160 rigidly secured thereto. These keepers are angularly arranged. The keepers include upper horizontal webs 161 and lower spaced horizontal webs 162 and 163. Webs 162 and 163 receive the lever 151 between them. The webs 161 and 163 have vertical openings formed therein and receive a vertical bolt 164 moved downwardly by a compressible coil spring 165. The lower end of the bolt has a beveled face 166. The beveled faces of the bolts face inwardly and such beveled faces are above the webs 162. The springs 165 bias the bolts 164 downwardly. The numeral 167, Figures 5, 6 and 23, designates a vertically swinging bell crank lever, mounted upon a fixed pivot 168, Figure 5, and provided at its upper free end with a horizontal lateral extension 169, Figure 6, which is slotted so that it can engage beneath the head of the bolt 164, to the right, Figures 5 and 6. When the lever 167 is swung clockwise, Figure 5, the corresponding bolt 164 is raised. A similar vertically swinging bell crank lever 170 is pivoted at 171, Figure 5, and is arranged to raise the bolt 164 to the left, when the bell crank lever 170 is swung counter-clockwise, Figure 5. The bell crank lever 167 has a cable 171' secured to its lower end, Figure 5, and this cable is passed about a guide pulley 172 and is attached to the left end of the bed 26. There is a slack in the cable 171', indicated at 172ª, and a slight retractile coil spring 173ª is connected across this slack. This spring is not sufficiently strong to swing the lever 167. When the bed 26 moves to the right from the starting position, Figure 23, the spring 154 is placed under tension and by the time the bed 26 approaches the end of its travel to the right and the spring 154 has been placed under tension to the fullest extent, the slack 172ª in the cable is taken up and the further movement of the bed 26 to the right will cause the cable 171' to swing the bell crank lever 167 clockwise, Figures 5 and 23, whereby the bolt 164 adjacent to the bell crank lever 167 is raised and this bolt will then release the lever 151, Figure 23, which is quickly thrown clockwise, Figures 5, 11 and 23, by the tension of the spring 154. When the lever 151 is swung clockwise, it will enter the space between the webs 162 and 163, to the left, Figures 5 and 19 to 20, and will then engage behind the bolt 164, and be held in place by this bolt. This movement of the lever 151 will shift the shaft 132, Figures 11 and 12, longitudinally, and the gear 135 will be brought into engagement with the gear 137, while gear 136 disengages gear 137 and the bed 26 will now have its direction of movement reversed and will travel to the left, Figure 23. The numeral 174 designates a cable attached to the lower end of the bell crank lever 170 and this cable is passed about a guide pulley 175, and the cable is attached to the front run of the chain 121. This cable has a slack therein indicated at 174ª, and a slight retractile coil spring 175 is connected across this slack, but is not sufficiently strong to swing the lever 170. When the bed 26 is traveling to the left, Figure 23, spring 154 has its tension relieved and spring 157 is placed under tension. The cable 171' is accumulating slack while the slack in the cable 174 is being taken up. When the bed 26 approaches the end of its travel to the left, Figure 23, and after the spring 157 has been placed under suitable tension, the slack 174ª is taken up and further movement of the bed 26 to the left causes the cable 174 to be pulled and the bell crank lever 170 is swung counter-clockwise, Figure 5, and the bolt 164 is raised by this bell crank lever whereby the lever 151, Figure 23, is released and the spring 157 will quickly throw the lever 151 counter-clockwise, Figures 5 and 23, to the position shown. At this position, the lever 151 is held behind the bolt 164 to the right. When the lever 151 is swung counter-clockwise to the position shown in Figure 11, shaft 132 is shifted longitudinally in an opposite direction and gear 136 brought into engagement with gear 137 and the chain 121 driven in an opposite direction and the bed 26 will now travel to the right, Figure 23, and the cycle of operation is repeated.

The means which causes the sprocket chain 125 to travel in opposite directions is practically the same as the means which operates the sprocket chain 121. The lever 151' corresponds to the lever 151, bell crank lever 167' corresponds to the bell crank lever 167 and bell crank lever 170' corresponds to bell crank lever 170. The gear box 131 arranged at the rear and carrying the lever 151', Figures 5, 13 and 14, has been inverted and turned around so that the drive shaft 130 extends above the gear box and the shaft 132, Figure 13, extends in an opposite direction to the shaft 132, Figure 11. Since the gear box 131, Figure 5, has been inverted, all parts carried thereby have been inverted and the bell crank levers 167' and 170' extend upwardly instead of downwardly. The bolts 164 seat upwardly and extend down below the webs 161. When the inverted bell crank lever 170' is swung counter-clockwise, Figure 5, the adjacent bolt 164 is moved downwardly and the lever 151', Figures 5, 13 and 22, is released. The bell crank lever 167', Figures 5 and 22, may be swung clockwise, Figure 5, and the adjacent bolt 164 is then moved downwardly to release the lever 151'. The lever 151' is connected with a cable 176, passed about a guide pulley 177 and a retractile coil spring 178 is connected therein. This cable 176 is connected with the rear run of the chain 125. The lever 151', Figure 22, is connected with a cable 179 passed about a guide pulley 180 having a retractile coil spring 181 connected therein. The cable 179 is connected with the left end of the bed 27.

The bell crank lever 167', Figures 5 and 22, has its upper end connected with a cable 182, passed about a pulley 183, and this cable has a slack 183ª therein, and a slight spring 184ª is connected across this slack and this spring is too weak to shift the bell crank lever. The cable 182 is connected with the left end of the bed 27, Figure 22. The bell crank lever 170' has a cable 184 connected therewith and this cable passes over a guide pulley 185 and has a slack 185ª therein, and a slight retractile coil spring 186ª is connected across this slack. The spring 186ª is not sufficiently strong to shift the lever 170'. The cable 184 is connected with the rear run of a sprocket chain 125. When the bed 27, Figure 22, is traveling to the left, the gear 136, Figure 14, engages gear 137. The chain 125 has its front run traveling to the left and its rear run traveling to the right and the tension is being let out of the spring 181 while the tension is being built up in spring 178. The lever 151' is now being held in the position shown in Figures 22, 5 and 13. The cable 184 is being pulled and the slack 185ª in this cable is being taken up and when the bed 27 approaches the end of its travel to the left, Figure 22, the cable 184 will swing the bell crank lever 170' counter-clockwise, Figure 5, and the lever 151' will be released and will then snap over to the rear position, Figures 13 and 22. The shaft 132, Figure 13, is now shifted to the left and the gear 135 will engage the gear 137 and the direction of travel of the chain 125 is reversed and bed 27 moves to the right, Figure 22. The chain 125 now travels to let out the tension in the spring 178 and to build up tension in the spring 181. The slack is restored in the cable 184 and is taken up in the cable 182. When the bed 27 approaches the end of its travel to the right, all slack is taken up in the cable 182 and the cable 182 will swing the bell crank lever 167' clockwise, Figures 5 and 22, and the bolt 164 will be lowered and the lever 151' released and the spring 181 will quickly throw the lever 151' to the forward position, Figures 5 and 22, and the cycle of operation is repeated.

The sprocket wheel 127 is rigidly mounted upon the upstanding shaft 130, Figure 14, and the sprocket wheel 122 is rigidly mounted upon the shaft 130, Figure 12. The shafts 132, Figure 6, are equipped with sprocket wheels 186 and 187 and these sprocket wheels are driven by sprocket chains 188 and 189, engaging sprocket wheels 190 and 191, Figure 6a. The sprocket wheels 190 and 191 are rigidly mounted upon a common drive shaft 192, and is driven by a motor 193, through the medium of speed reducing gearing 194. Any other suitable means may be employed to rotate the shafts 132. The shafts 132 may be driven at the same speed, and this speed may be varied by regulating the drive of the motor 193. The shafts 132 may be driven at different speeds with respect to each other, and this may be effected by substituting a sprocket wheel of different diameter for either sprocket wheel 186 or 187. The timing of the operation of the releasable latch devices for the levers 151 and 151' may be regulated or changed by varying the lengths of the cables 171' and 174; and 182 and 184. The cams 148', Figure 13, corresponds to the cam 148, Figure 11, and is moved by the lever 151' which is located at the top of the gear box 131, Figure 5, instead of at the bottom of the gear box like lever 151. The cam 148' tapers from the outer end of the lever 151', while the cam 148 tapers toward such outer end, Figures 13 and 11.

The operation of the apparatus will be further understood by a consideration of Figure 24. In this figure, the fabric base F is traveling forwardly in the direction of the arrow. The fabric base is fed longitudinally in a forward direction by the feed rollers 61 and 62, as explained, while the two groups of tufting machines are being reciprocated in opposite directions transversely of and at right angles to the line of feed of the fabric base. The reciprocation of the groups of tufting machines is effected by shifting the supporting units including the beds 26 and 27. In Figure 24, the needles 37 of the front and rear groups of tufting machines have been shown. The needles indicated in dotted lines are at the starting position and those indicated in full lines are in the completed or shifted position. The two sets of needles are spaced longitudinally of the line of feed of the fabric base, and this spacing may be varied to change to shape and size of the design produced. In the illustration given in Figure 24, the needles in the front group are shifted transversely of the line of feed of the base fabric for the same distance that the needles in the rear group are shifted. The needles 37 in the rear group R form the zig-zag line of tufting A while the needles 37 in the front group R' form the zig-zag line of tufting B. Since there are four pairs of needles in the rear group R, four lines of tufting A are produced, and since there are four pairs of needles in the front group R', four lines of tufting B are produced. It is obvious that the number of lines of tufting may be varied by varying the number of needles in each group. Since the needles in each group are assembled in pairs, each line of tufting includes two lines of tufting, although the number of lines of tufting in each line may vary from 1 to any desired number above 1. The line of tufting A includes diagonally arranged portions $a$ and $a'$, alternately arranged and extending in opposite directions. The line of tufting B includes diagonal portions $b$ and $b'$, alternately arranged and extending in opposite directions. Assuming that the fabric base has been fed forwardly to the feed rollers 61 and 62, it will then be passed beneath the needles of the front and rear groups of needles. Starting the apparatus with the bed 26 in the extreme left position and traveling to the right, Figure 23, the leading diagonal portion $b$ of line B is formed, and diagonal portion $b'$ is formed when the carriage 26 travels to the left, shifting the needles 37 with it. The remaining diagonal portions are formed until the trailing diagonal portion $b$ is formed which extends to the needles 37 of the front group which have been shifted to the right. The leading diagonal portion $b$ and the trailing diagonal portion $b$ correspond. The leading diagonal portion $a$ is formed by the needles of the rear group R, when the needles in the rear group were shifted to the left, the carriage 27 traveling in the direction of the arrow, Figure 22. When the carriage 27 is shifted to the right, Figure 22, the needles form the diagonal portion $a'$, and the diagonal portions $a$ and $a'$ are alternately produced until the trailing diagonal portion $a$ is produced. The trailing diagonal portion $a$ corresponds to the leading diagonal portion $a$. The diagonal portions $b$ extend across the diagonal portions $a$, and the diagonal portions $b'$ extend across the diagonal portions $a'$. The diagonal portions $a$ and $a'$ are sewed during the period that the fabric is being fed for the distance between the rear and front groups of needles or tufting machines R and R' and the same is true of the formation of each pair of diagonal portions $b$ and $b'$. A pair of diagonal portions $b$ and $b'$ project beyond the leading diagonal portion $a$ and a pair of diagonal portions $a$ and $a'$ extend rearwardly beyond the trailing diagonal portion $b$. The intersecting diagonal portions produce a row of diamonds extending longitudinally of the line of feed of the fabric base. The tufting mechanism thus shown and described will produce four rows of these diamonds.

There are several conditions under which the shape of the diamonds may be changed. Assuming that the fabric base is traveling at a constant speed, then the design may be varied by varying the distance between the front and rear tufting mechanisms. If the distance between the front and rear tufting mechanisms longitudinally of the line of feed of the fabric base is increased, and the tufting mechanisms shifted transversely for the same distance, then the diamonds produced would be elongated in a direction longitudinally of the line of feed of the fabric base, Figure 26. If the distance between the front and rear tufting mechanisms is materially shortened and the tufting mechanisms shifted for the same transverse distances, then the diamond shaped figures would be increased in length transversely of the line of feed of the fabric base, Figure 28. The angle of the sides of the diamonds may be varied and hence the shape of the diamond changed by varying the speed of the transverse movement of the front or rear tufting mechanisms, or both. The shape of the diamond will be varied by varying the timing of the reversing mechanism for the tufting mechanisms or beds 26 and 27, and this varying of the timing will change the length of the stroke of the reciprocating tufting machine and hence the length of the sides of the diamonds, Figure 27. The shape of the design or diamonds may be varied by varying the relative starting positions of the needles upon the continuous horizontal bars, when such bars are used in the groups of tufting machines or the front and rear tufting mechanisms. The shape of the design can also be varied by varying the shape of the cam which shifts the tufting mechanisms, transversely of the line of feed of the fabric.

In Figure 25, I have illustrated a modified operation. In this figure, the rear and front groups R and R' of needles are spaced longitudinally of the feed of the fabric. The needles 37 in the rear group are shifted in one direction only while the fabric is being fed from group R to group R', providing a zig-zag line of stitching C including diagonal portions c and c'. The needles in the front group R' are shifted in the same manner to produce a line of stitching D including diagonal portions d and d'. When the needles in the rear group R are being shifted transversely of the line of feed of the fabric base, the needles in the front group R' are being shifted transversely of the line of feed of the fabric base and in the same direction with the needles in the rear group. When the needles in the front group R' are shifted to the left, they produce the diagonal portion d of the line D and when shifted to the right, they produce the next trailing diagonal portion d', and these diagonal portions are produced alternately and are inclined in opposite directions. The leading diagonal portion d and the trailing diagonal portion d correspond. The needles 37 in the rear group R produce the leading inclined portion c and the next trailing portion c' and these diagonal portions are alternately produced throughout the tufting line C. The leading diagonal portion c corresponds to the trailing diagonal portion c. The leading diagonal portion d extends forwardly beyond the leading diagonal portion c and the trailing diagonal portion c extends rearwardly beyond the trailing diagonal portion d. The diagonal portions of the zig-zag lines of tufting cross to produce the diamonds arranged in a row extending longitudinally of the direction of feed of the fabric base.

It is to be understood that the form of apparatus herewith shown and described is to be taken as a preferred example of the same, and that various changes in the shape, size and arrangement of parts may be resorted to without departing from the spirit of the invention or the scope of the subjoined claims.

Having thus described the invention, what is claimed is:

1. In a machine for sewing lines of severed or unsevered tufting in a fabric base, a supporting structure, means connected with the supporting structure to feed the fabric base in one direction, a supporting unit mounted upon the supporting structure and movable transversely of the line of feed of the fabric base, tufting mechanism mounted upon the supporting unit to be bodily shifted thereby, means to reciprocate the supporting unit including reversible gearing, releasable means to hold the reversible gearing in one shifted position, means operated by the movement of the supporting unit when it nears the end of its travel in one direction to actuate the holding means and cause the same to release the gearing for shifting action, and means to quickly shift the gearing when it is released so that it moves the supporting unit in an opposite direction.

2. In a machine for sewing lines of severed or unsevered tufting in a faric base, a supporting structure, means mounted upon the supporting structure to feed the fabric base in one direction, a supporting unit mounted upon the supporting structure and movable transversely of the line of feed of the fabric base, tufting mechanism mounted upon the supporting unit to be bodily shifted thereby, means to reciprocate the supporting unit including reversible gearing, a lever to shift the gearing for reversing its action, a latch device to hold the lever against movement, means to move the lever when released by the latch device, and means operated by the movement of the supporting unit to operate the latch device to cause it to release the lever.

3. In a machine for sewing lines of severed or unsevered tufting in a fabric base, a supporting structure, means mounted upon the supporting structure to feed the fabric base in one direction, a supporting unit mounted upon the supporting structure and movable transversely of the line of feed of the fabric base, tufting mechanism mounted upon the supporting unit to be bodily shifted thereby, means to reciprocate the supporting unit including reversible gearing, a lever to shift the gearing for reversing its action, means to swing the lever in opposite directions, a latch device to hold the lever against movement when shifted to the end of its travel in either direction, and means operated by the movement of the supporting unit to operate said latch device to release the lever.

4. In a machine for sewing lines of severed or unsevered tufting in a fabric base, a supporting structure, means mounted upon the supporting structure to feed the fabric base in one direction, a supporting unit mounted upon the supporting structure and movable transversely of the line of feed of the fabric base, tufting mechanism mounted upon the supporting unit to be bodily shifted thereby, a device connected with the supporting unit to reciprocate the same, a rotary element engaging the device, reversible gearing to drive the rotary element, a lever to shift the gearing for reversing its action, springs connected with the lever to move it in opposite directions, the springs being alternately placed under tension when the supporting unit is moved in an opposite direction, a latch device to hold the lever against movement when shifted in one direction, and means operated by the movement of the supporting unit to operate said latch device to release the lever.

5. In a machine for sewing lines of severed or unsevered tufting in a fabric base, a supporting structure, rollers mounted upon the supporting structure to feed the fabric base in one direction, a supporting unit, means to mount the supporting unit upon the supporting structure for movement transversely of the line of feed of the fabric base, a rotatable shaft extending longitudinally of the supporting unit and mounted upon the supporting unit to be bodily shifted thereby, means to drive the shaft, bar means arranged above the fabric base for carrying needles, devices to reciprocate the bar means and mounted upon the supporting unit and driven by the rotatable shaft, a rock shaft extending longitudinally of the supporting unit and mounted upon the supporting unit and shifted bodily therewith, looper devices mounted upon the rock shaft for coaction with the needles, a connecting rod, a cam mounted upon the supporting structure to drive the connecting rod, a driving connection between the connecting rod and the rock shaft, an intermittent device to turn one fabric feed roller, and driving connecting means between the intermittent device and the connecting rod.

6. In a machine for sewing lines of severed or unsevered tufting in a fabric base, a supporting structure, rollers mounted upon the front portion of the supporting structure to feed the fabric longitudinally in a forward direction, forward and rear supporting units, means to mount the forward and rear supporting units upon the supporting structure for movement transversely of the line of feed of the fabric base, a rotatable shaft extending longitudinally of each supporting unit and mounted upon each supporting unit to be bodily shiftable therewith, means to drive each shaft, bar means arranged adjacent to each supporting unit and arranged above the fabric base for carrying needles, devices to reciprocate each bar means and mounted upon each supporting unit and driven by the corresponding rotatable shaft, a rock shaft extending longitudinally of each supporting unit and mounted upon each supporting unit and shiftable bodily therewith, looper devices mounted upon each rock shaft for coaction with the needles, a connecting rod, means mounted upon the supporting structure to move the connecting rod longitudinally, cranks engaging the rock shafts to turn them, means connecting the cranks together and with the connecting rod, an intermittent drive device connected with one fabric feed roller, a pivoted lever connected with the connecting rod, and a link connecting lever and the intermittent drive device.

7. In a machine for sewing lines of severed or unsevered tufting in a fabric base; a supporting structure; means mounted upon the supporting structure to feed the fabric base in one direction; supporting units mounted upon the supporting structure to be reciprocated transversely of the line of feed of the fabric base, said supporting units being spaced longitudinally of the line of feed of the fabric base, each supporting unit including upper and lower vertically spaced beds, the lower beds being arranged at substantially the same elevation and having the fabric base passing over them; separate tufting units arranged beneath each upper bed and spaced longitudinally of the upper bed, each tufting unit including a substantially horizontal arm, an upstanding head, an upstanding stock extending above the arm and secured to the upper bed, a substantially horizontal drive shaft carried by the arm and an upstanding reciprocatory bar; needles carried by the upstanding reciprocatory bars; a shaft extending longitudinally of each upper bed and mounted upon such upper bed to reciprocate therewith; driving means connecting each longitudinal shaft with the drive shafts of the tufting units which are mounted upon the same upper bed with such longitudinal shaft; means to drive the longitudinal shafts; a rock shaft arranged beneath and extending longitudinally of each lower bed and mounted upon such lower bed to reciprocate with the lower bed; loopers mounted upon each rock shaft for coaction with the needles of the adjacent tufting units; means to turn each rock shaft while it is reciprocating; and means to reciprocate said supporting units.

8. In a machine for sewing lines of severed or unsevered tufting in a fabric base; a supporting structure; means mounted upon the supporting structure to feed the fabric base in one direction; supporting units mounted upon the supporting structure to be reciprocated transversely of the line of feed of the fabric base, said supporting units being spaced longitudinally of the line of feed of the fabric base, each supporting unit including upper and lower vertically spaced beds, the lower beds being arranged at substantially the same elevation and having the fabric base passing over them; separate tufting units arranged beneath each upper bed and spaced longitudinally of the upper bed, each tufting unit including a substantially horizontal arm, an upstanding head, an upstanding stock extending above the arm and secured to the upper bed, a substantially horizontal drive shaft carried by the arm and an upstanding reciprocatory bar; needles carried by the upstanding reciprocatory bars; a shaft extending longitudinally of each upper bed and arranged above such upper bed and mounted upon such upper bed to reciprocate therewith; sprocket wheels mounted upon each longitudinal shaft; sprocket wheels mounted upon the drive shafts of each set of tufting units; sprocket chains engaging the sprocket wheels of each longitudinal shaft and the sprocket wheels of the adjacent set of tufting units; means to drive the longitudinal shafts; loopers mounted upon and arranged beneath each lower bed and arranged in cooperative relation to the needles of the adjacent set of tufting units; means to move the loopers in timed relation to the needles; and means to reciprocate the supporting units.

9. In a machine for sewing lines of severed or unsevered tufting in a fabric base; a supporting structure; means mounted upon the supporting structure to feed the fabric base longitudinally; a supporting unit mounted upon the supporting structure to reciprocate transversely of the line of feed of the fabric base, said supporting unit including upper and lower vertically spaced beds; means to reciprocate the supporting unit; separate tufting units spaced longitudinally of the upper bed and bodily mounted upon the upper bed to reciprocate therewith; needles carried by the tufting units; a shaft extending longitudinally of the upper bed and mounted upon the upper bed to reciprocate therewith; driving connecting means between the longitudinal shaft and the tufting units; a driving wheel mounted upon the longitudinal shaft to turn it, said shaft being movable longitudinally with relation to the driving wheel; means to hold the driving wheel against axial movement; means to rotate the driving wheel; a rock shaft extending longitudinally of the lower bed and mounted upon the lower bed to reciprocate therewith; loopers mounted upon the rock shaft for co-action with said needles; an element mounted upon the rock shaft to turn the rock shaft, the rock shaft being longitudinally movable with respect to said element; means to hold the element against axial movement; and means to move the element to turn the rock shaft.

References Cited in the file of this patent

UNITED STATES PATENTS

| Number | Name | Date |
|---|---|---|
| 376,621 | Zallud | Jan. 17, 1888 |
| 379,478 | Koch | Mar. 13, 1888 |
| 876,562 | Kleutgen | Jan. 14, 1908 |
| 913,195 | Brown | Feb. 23, 1909 |
| 2,216,096 | Card | Sept. 24, 1940 |
| 2,492,711 | Pickworth | Dec. 27, 1949 |
| 2,564,631 | Veitch | Aug. 14, 1951 |